(12) United States Patent
Staver

(10) Patent No.: US 9,140,901 B2
(45) Date of Patent: Sep. 22, 2015

(54) ULTRA WIDE BAND ACHROMATIC RISLEY PRISM SCANNER

(75) Inventor: Philip R. Staver, Wilton, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 201 days.

(21) Appl. No.: 13/879,543

(22) PCT Filed: Aug. 8, 2012

(86) PCT No.: PCT/US2012/049895
§ 371 (c)(1),
(2), (4) Date: Apr. 15, 2013

(87) PCT Pub. No.: WO2013/025404
PCT Pub. Date: Feb. 21, 2013

(65) Prior Publication Data
US 2014/0185119 A1    Jul. 3, 2014

Related U.S. Application Data

(60) Provisional application No. 61/522,712, filed on Aug. 12, 2011.

(51) Int. Cl.
*G02B 26/08* (2006.01)
*G02B 26/10* (2006.01)
*G02B 26/12* (2006.01)
*G02B 27/00* (2006.01)

(52) U.S. Cl.
CPC .......... *G02B 26/108* (2013.01); *G02B 26/0891* (2013.01); *G02B 27/0025* (2013.01)

(58) Field of Classification Search
CPC .......... G02B 27/0025; G02B 26/0891; G02B 26/108
USPC ............. 359/201.1, 211.1, 211.2, 211.3, 359/196.1–226.3; 356/336, 338; 362/309, 362/327, 268, 331
See application file for complete search history.

(56) References Cited

U.S. PATENT DOCUMENTS

| | | | |
|---|---|---|---|
| 6,624,956 B1 | 9/2003 | Shechterman | |
| 2005/0024479 A1 | 2/2005 | Itabashi et al. | |
| 2005/0195505 A1* | 9/2005 | Braun et al. | 359/837 |
| 2005/0213964 A1* | 9/2005 | Kreger et al. | 396/544 |
| 2006/0044653 A1 | 3/2006 | Stolk | |
| 2007/0024978 A1 | 2/2007 | Jackson et al. | |

* cited by examiner

*Primary Examiner* — Scott J Sugarman
*Assistant Examiner* — Mustak Choudhury
(74) *Attorney, Agent, or Firm* — Daniel J. Long; Sand & Sebolt

(57) ABSTRACT

A system and method for scanning a wide band beam is presented. An apparatus includes a pair of prism triplets. Each prism triplet includes a first wedge prism, a second wedge prism and a third wedge prism all formed with different optical materials. In operation, a beam passing through the wide band team scanning apparatus first passes through the first, second and third wedge prisms of the first prism triplet. The beam then passes through the wedge prisms of the second prism triplet in a mirrored order (the third, then second, then first wedge prisms) than that of the first prism triplet. This apparatus with two prism triplets allows wide band light transmitted through it to emerge with its plurality of different wavelengths of light travelling in the same direction to equalize net dispersive effects each of different wavelengths.

14 Claims, 3 Drawing Sheets

ULTRA WIDE BAND ACHROMATIC RISLEY PRISM SCANNER

STATEMENT OF GOVERNMENT INTEREST

The invention was made with United States Government support under Contract No 09-C-8656. The United States Government has certain rights in this invention.

BACKGROUND OF THE INVENTION

1. Field of Invention

The current invention relates generally to apparatus, systems and methods for controlling waves. More particularly, the apparatus, systems and methods relate to steering (e.g., scanning) achromatic waves using one or more prisms. Specifically, the apparatus, systems and methods provide for steering achromatic beams with a triplet pairs of prisms so that the beams behave as though they are monochromatic.

2. Description of Related Art

In modern optical sensors and imaging systems it is often desirable to steer or deflect incoming beams of light in order to capture data in multiple fields of the beam. This beam steering, also known as beam scanning, is conventionally performed using a Risley prism scanner. FIG. 1 illustrates a prior art Risley prism pair. A Risley prism scanner is an optical device comprised of two identical prisms placed into an optical beam such that the prisms can be rotated about an axis parallel to the optical beam. This action results in the steering of the beam as it leaves the prism pair, and for example, can act as a beam steering device to direct a laser beam into the far-field through a large steerable angle, characteristic of each prism's makeup of optical material and wedge angle.

However, because the index of refraction of an optical material is a strong function of the wavelength (color), the amount of deflection interposed on the beam varies strongly with wavelength. Although this is a useful phenomenon in some circumstances, it is highly undesirable in many others because it limits the spectral bandwidth of beams that are steerable using a conventional Risley prism scanner. For this reason, conventional Risley prism scanners are only useful for monochromatic systems, such as single-wavelength laser systems or optical imaging systems having very narrow band-pass filters. A need therefore exists for a device, system and/or apparatus that is capable of steering an achromatic beam so that the beam behaves as if it were a monochromatic beam.

SUMMARY

The preferred embodiment of the invention includes a wide band achromatic beam scanning device that uses two multi-prisms wherein each prism is comprised of multiple components and each component is constructed of a different type of optical material. The relative position, wedge angle orientation, and optical material of each component is optimized such that wide band light transmitted through all of the components emerges with all wavelengths travelling in the same direction thereby equalizing net dispersive effects for all wavelengths. Therefore, in general, most embodiments of the present invention provides for beam scanning devices that steer an achromatic beam so that the beam behaves as if it were a monochromatic beam. Particular applications require different positions, orientations, and optical materials to achieve these desired effects and therefore it is contemplated that the present invention has a plurality of exemplary embodiments.

In one configuration of the preferred embodiment, an apparatus includes a pair of prism triplets. Each prism triplet includes a first wedge prism, a second wedge prism and a third wedge prism all formed with different optical materials. In the preferred embodiment, the first wedge prism is formed out of zinc sulfide (ZnS), the second wedge prism is formed out of zinc selenide (ZnSe) and the third wedge prism is formed out of gallium arsenide (GaAs).

In operation, a beam passing through the wide band beam scanning apparatus first passes through the first, second and third wedge prisms of the first prism triplet. The beam then passes through the wedge prisms of second prism triplet in a mirrored order (the third, then second, then first wedge prisms) than that of the first prism triplet. This apparatus with two prism triplets allows wide band light transmitted through it to emerge with its plurality of different wavelengths of light travelling in the same direction to equalize net dispersive effects each of different wavelengths.

In more detail, the first wedge prisms is formed with a first planar surface and a second planar surface tilted at a first angle (e.g., wedge angle) with respect to the first planar surface. The second wedge prism further includes third and fourth planar surfaces at second wedge angle and the third wedge prism further includes fifth and sixth planar surfaces formed with a third wedge angle. In the preferred embodiment, the first, second and third wedge angles are all different. In some embodiments, the third angle is less that the first angle and the second angle and additionally, the second angle is greater than the second angle. The third angle can be about 10 degrees, the second angle can be about 40.3 degrees, and the third angle can be about 13.95 degrees.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
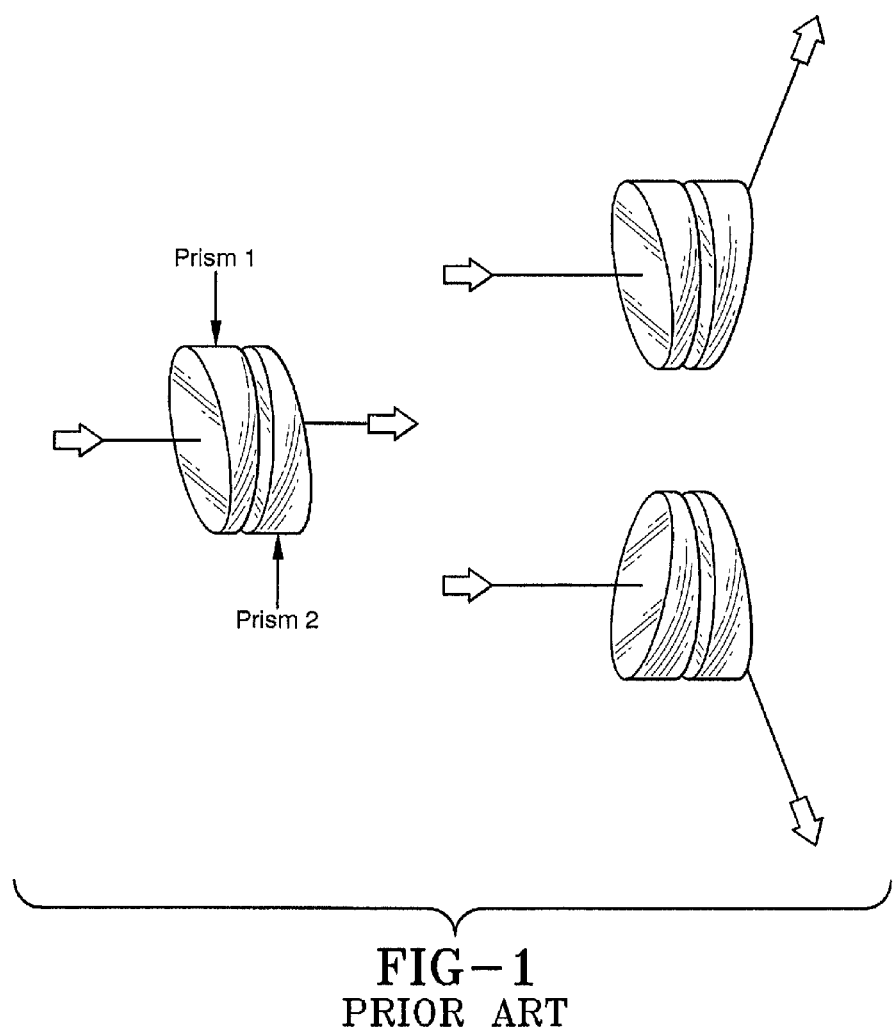
FIG. 1 illustrates a prior art Risley prism pair.
Figure 2:
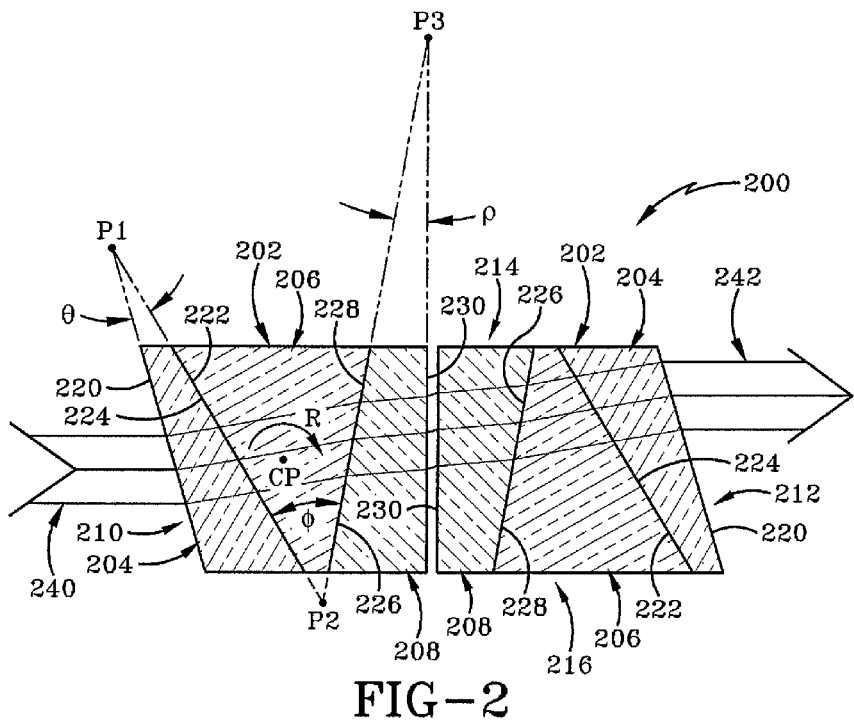
FIG. 2 illustrates an example preferred embodiment of a side view of a three-component prism pair is used to provide wide band, achromatic beam scanning where one of the three-component prism pairs has been rotated 180 degree with respect to the other.
Figure 3:
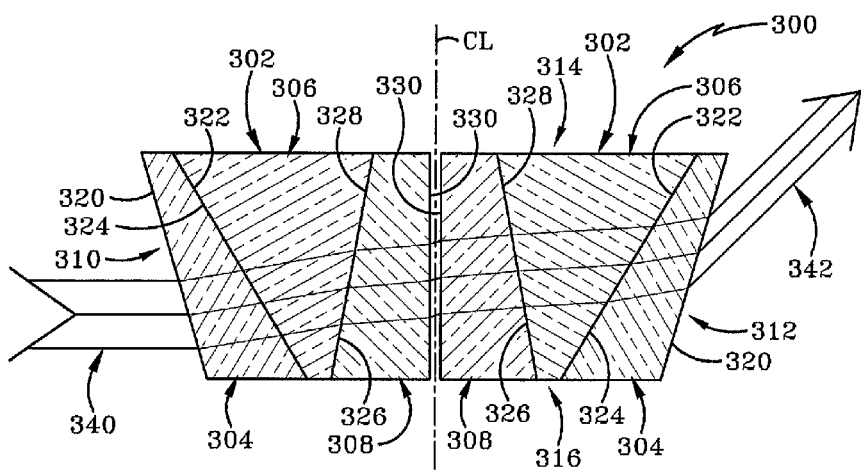
FIG. 3 illustrates another example embodiment of a side view of a three-component prism pair used to provide wide band, achromatic beam scanning where one of the three-component prism pairs is a mirrored version of the other.

FIGS. 2 and 3 illustrate exemplary embodiments of wide band beam scanning devices 200, 300 that use two multi-prisms 202, 302 each. One of the multi-prisms 202 of the wide band beam scanning device 200 of FIG. 2 has been rotated 180 degrees in the direction of arrow R about center point CP. Orienting the two multi-prisms 202 in this way provides for a wide band beam scanning device 200 that passes an input beam 240 through it so that its output beam 242 has zero degrees of scan. In another configuration shown in FIG. 3, one of the multi-prisms 302 of the wide band beam scanning device 300 has been flipped about a centerline CL of the wide band beam scanning device 300 so that its two multi-prisms 302 mirror each other. This configuration provides for a wide band beam scanning device that does not pass a beam through it with zero degrees of scan. In the example of FIG. 3, the mirrored orientation of the multi-prisms 302 receive an input beam 340 and provides for about 45 degrees of scan at the output beam 342. Those of ordinary skill in the art will appreciate that multi-prisms can be designed so that the scan could be other angles.

The wide band beam scanning device 200 of FIG. 2 is now explained in greater detail and this explanation also applies to the scanning device 300 of FIG. 3. Both multi-prisms 202, are comprised of three separate prisms 204, 206, 208. In the preferred embodiment, each prism 204, 206, 208 is constructed of a different type of optical material and are generally wedge-shaped. The three prisms 204, 206, 208 are stacked together and then the two multi-prisms are combined to form a wide band beam scanning device 200 with a left side 210, a right side 212, a top side 214 and a bottom side 216. Each wedge-shaped prism 204, 206, 208 has left and right surfaces that form angles with respect to each other. In the preferred embodiment, for example, prism 204 has a left surface 220 and a right surface 222 that form a wedge angle (θ) at point P1 of about 13.95 degrees; prism 206 has a left surface 224 and a right surface 226 that form a wedge angle (φ) at point P2 of about 40.3 degrees; and prism 208 has a left surface 228 and a right surface 230 that form a wedge angle (ρ) at point P3 of about 10.0 degrees.

Similar to the scanning device 200 of FIG. 2, the scanning device 300 in FIG. 3 is formed with two multi-prisms 302 that are also comprised of three separate prisms 304, 306, 308. The three prisms 304, 306, 308 are stacked together and then the two multi-prisms 302 are combined to form a wide band beam scanning device 300 with a left side 310, a right side 312, a top side 314 and a bottom side 316. Also, similar to the scanning device 200 of FIG. 2, prism 301 has a left surface 320 and a right surface 322; prism 306 has a left surface 324 and a right surface 326; and prism 308 has a left surface 328 and a right surface 330.

Returning to FIG. 2, the relative position, wedge angle orientation, and optical material type of each prism 204, 206, 208 (e.g, components) is optimized such that wide band light transmitted through all of the components 204, 206, 208 emerges with all wavelengths travelling in the same direction, thereby equalizing net dispersive effects for all wavelengths. Particular applications require differing positions, orientations, and optical materials, therefore it is contemplated that the present invention has a plurality of exemplary embodiments. For the application shown in FIG. 2, each prism triplet 202 is comprised of three different material types, ZnS, ZnSe, and GaAs. Even in this application, there are other material types that could perform equally well as these materials so this example is not meant to limit the usage of other glass types in other embodiments of this invention.

In order to find the best geometrical configuration for each component prism within a multi-prism 202, the wedge angle orientation of one of the component prisms should be varied systematically and input into a conventional ray-trace program such as Zemax, for example. The spectrum of transmitted rays can then be computed for several wavelength values and the relative angles between them. In an exemplary embodiment, the optical design program's optimization capability should be used to determine the values of the other component prism wedge angles so as to minimize the angular separation between the emerging wavelengths. The results of the optimization leading to the prism pair illustrated in FIG. 2 are shown in Table 1. The last column, labeled "S DEV," is the standard deviation of the differing transmitted ray angles computed over a wavelength. It shows that the prism geometry which gave the best performance was obtained when the wedge angle (ρ) of the GaAs prism was about 10 degrees. In this analysis, the values of Θ, χ, and ρ represent the wedge angles of the ZnS, ZnSe, and GaAs prisms, respectively. Therefore, an embodiment of the present invention provides a beam scanning device 200, 300 that is achromatic over a large wavelength band.

TABLE 1

(Optimization Results of varying the value of the wedge
of the GaAs prism from 8 to 12 degrees. The last column
represents the variation in scan angle (in units of micro-radians)
for the spectral band ranging from 3 to 10 microns)
Achromatic Prism: Doublet Trio

| ρ (deg) (GaAs) | Θ (deg) (ZnS) | Φ (deg) (ZnSe) | S DEV (micro-radians) |
|---|---|---|---|
| 8.000 | 13.471 | 36.575 | 233 |
| 9.000 | 13.607 | 38.184 | 110 |
| 10.000 | 13.742 | 39.796 | 47.5 |
| 11.000 | 13.878 | 41.412 | 165 |
| 12.000 | 14.009 | 43.031 | 300 |

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
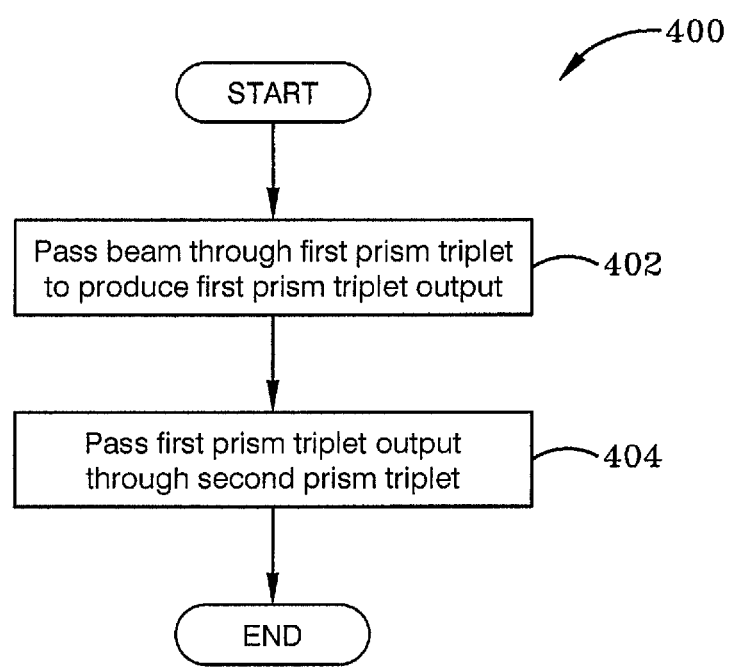
FIG. 4 illustrates an example embodiment of a method for steering achromatic beams so that they generally behave as if they were monochromatic beams.

FIG. 4 illustrates a method 400 of scanning a wide band beam. The method 400 begins by passing the wide band beam through a first prism triplet, at 402, and generating a first prism triplet output. The first prism triplet can be formed with a first wedge prism, a second wedge prism and a third wedge prism. The method 400 can pass the beam through a first wedge prism formed of zinc sulfide (ZnS) and having a wedge angle of about 13.95 degrees, a second wedge prism formed of zinc selenide (ZnSe) and having a wedge angle of about 40.3 degrees, and a third wedge prism formed of gallium arsenide (GaAr) and having a wedge angle of about 10.0 degrees.

The method 400 passes the first prism triplet output through a second prism triplet, at 404, to generate a second prism triplet output. Passing light through two multi-prisms in this way ensures all wavelengths of the output travel in the same direction to equalize any net dispersive effects for wavelengths of the original light beam.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A wide band beam scanning apparatus comprising:
    a pair of prism triplets comprising a first prism triplet and a second prism triplet,
    wherein the first prism triplet and the second prism triplet both include a first wedge prism, a second wedge prism and a third wedge prism, wherein the first wedge prism and the second wedge prism are formed with different optical materials;
    wherein components of the wide band beam scanning apparatus are arranged so that a beam passing through the wide band beam scanning apparatus first passes through the first wedge prism of the first prism triplet, then the second wedge prism of the first prism triplet, then the third wedge prism of the first prism triplet, then the third wedge prism of the second prism triplet, then the second wedge prism of the second prism triplet and then the first wedge prism of the second prism triplet;
    wherein the second prism triplet is rotated 180 degrees about a center point with respect to the first prism triplet so that the wide band beam scanning apparatus is configured to have a beam exiting the third wedge prism of the first prism triplet and next enter the third wedge prism of the second prism triplet before entering the first wedge prism of the second prism triplet;
    wherein the third angle is about 10 degrees, the second angle is about 40.3 degrees, and the first angle is about 13.95 degrees;
    wherein the first wedge prism is formed out of zinc sulfide (ZnS), the second wedge prism is formed out of zinc selenide (ZnSe) and the third wedge prism is formed out of gallium arsenide (GaAs).

2. The wide band beam scanning apparatus of claim 1 wherein wide band light transmitted through the wide band beam scanning apparatus emerges with a plurality of different wavelengths of light travelling in the same direction to equalize net dispersive effects for the plurality of different wavelengths of light.

3. The wide band beam scanning apparatus of claim 1 wherein the first wedge prism further comprises:
    a first planar surface and a second planar surface tilted at a first angle with respect to the first planar surface, wherein the second wedge prism further comprises:
    a third planar surface and a fourth planar surface tilted at a second angle with respect to the third planar surface, wherein the third wedge prism further comprises:
    a fifth planar surface and a sixth planar surface tilted at a third angle with respect to the fifth planar surface; and
    wherein the first angle is different than the second angle.

4. The wide band beam scanning apparatus of claim 3 wherein the first angle is different than the third angle, and wherein the second angle is different than the third angle.

5. The wide band beam scanning apparatus of claim 3 wherein the third angle is less than the first angle and the second angle, and wherein the second angle is greater than the second first or third angle.

6. The wide band beam scanning apparatus of claim 1 wherein the first wedge prism and the second wedge prism are formed with different optical materials, and wherein the second wedge prism and the third wedge prism are formed with different optical materials.

7. The wide band beam scanning apparatus of claim 1 wherein cross-sections of the first wedge prism, the second wedge prism and the third wedge prism through which a beam is configured to pass are all trapezium in shape.

8. The wide band beam scanning apparatus of claim 1 wherein a beam passing through the wide band beam scanning apparatus has essentially zero degrees of scan.

9. The wide band beam scanning apparatus of claim 1 wherein the second prism triplet is a mirror image of the first prism triple triplet with respect to a vertical centerline between the third wedge prism of the first prism triplet and the third wedge prism of the second prism triplet.

10. The wide band beam scanning apparatus of claim 9 wherein a beam passing through the wide band beam scanning apparatus has essentially 45 degrees of scan.

11. The wide band beam scanning apparatus of claim 1 wherein the wide band beam scanning apparatus is formed with the third wedge prism of the first prism triplet adjacent the third wedge prism of the second prism triplet.

12. A method of scanning a wide band beam comprising:
    passing the wide band beam through a first prism triplet and generating a first prism triplet output;
    passing the first prism triplet output through a second prism triplet generating a second prism triplet output with wavelengths of the second prism triplet output traveling in the same direction to equalize net dispersive effects for wavelengths; and
    wherein the second prism triplet is rotated 180 degrees about a center point with respect to the first prism triplet; and
    wherein the passing the wide band beam through a first prism triplet further comprises:
        passing the wide band beam through two surfaces of a first wedge prism that form an angle of about 13.95 degrees the two surfaces of the first wedge prism;
        passing the wide band beam through two surfaces of a second wedge prism that form an angle of about 40.3 degrees the two surfaces of the second wedge prism; and
        passing the wide band beam through two surfaces on a third wedge prism that form an angle of about 10 degrees the two surfaces of the third wedge prism;
    wherein the passing the wide band beam through a first prism triplet further comprises:

passing the wide band beam through a first wedge prism formed of zinc sulfide (ZnS);

passing the wide band beam through a second wedge prism formed of zinc selenide (ZnSe); and passing the wide band beam through a third wedge prism formed of gallium arsenide (GaAr).

13. The method of scanning a wide band beam of claim 12 wherein the passing the wide band beam through a first prism triplet further comprises:

passing the wide band beam through a first wedge prism, a second wedge prism and a third wedge prism all formed in the first prism triplet; and wherein the passing the wide band beam through a second prism triplet further comprises:

passing the wide band beam through a fourth wedge prism, a fifth wedge prism and a sixth wedge prism all formed in the second prism triplet.

14. A wide band beam scanning apparatus comprising:

a pair of prism triplets comprising a first prism triplet and a second prism triplet, wherein the first prism triplet and the second prism triplet both include a first wedge prism, a second wedge prism and a third wedge prism;

wherein components of the wide band beam scanning apparatus are arranged so that a beam passing through the wide band beam scanning apparatus first passes through the first wedge prism of the first prism triplet, then the second wedge prism of the first prism triplet, then the third wedge prism of the first prism triplet, then the third wedge prism of the second prism triplet, then the second wedge prism of the second prism triplet, and then the first wedge prism of the second prism triplet;

wherein wide band light transmitted through the wide band beam scanning apparatus emerges with a plurality of different wavelengths of light travelling in the same direction to equalize net dispersive effects for the plurality of different wavelengths of light; and wherein the first wedge prism has a wedge angle of about 13.95 degrees, the second wedge prism has a wedge angle of about 40.3 degrees, and the third wedge prism has a wedge angle of about 10.0 degrees.

\* \* \* \* \*